United States Patent [19]

Eastwood et al.

[11] E Re. 28,466

[45] Reissued July 8, 1975

[54] HOT TOP FOR BIG-END-UP INGOT MOLDS AND METHOD OF ASSEMBLING SAME

[75] Inventors: Fred Eastwood, Fairview Park; John Harry Brindle, Lakewood, both of Ohio; Frederick L. Kolb, Jr., Venetia, Pa.

[73] Assignee: Foseco International Ltd., Birmingham, England

[22] Filed: June 20, 1972

[21] Appl. No.: 273,526

Related U.S. Patent Documents

Reissue of:

[64] Patent No.: 3,458,169
Issued: July 29, 1969
Appl. No.: 389,656
Filed: Aug. 14, 1964

[52] U.S. Cl. ..... 249/201; 29/428
[51] Int. Cl. ..... B22d 7/10
[58] Field of Search ..... 249/106, 197–202; 164/53, 137; 29/428

[56] References Cited

UNITED STATES PATENTS

| | | | |
|---|---|---|---|
| 1,921,729 | 8/1933 | Charman | 249/201 |
| 2,129,821 | 9/1938 | Charman | 249/106 X |
| 2,495,992 | 1/1950 | Urmetz | 249/106 |
| 2,668,336 | 2/1954 | Jones | 249/106 |
| 2,925,637 | 2/1960 | Edmonds et al. | 249/201 X |
| 3,006,046 | 10/1961 | Shephard et al. | 249/197 UX |
| 3,039,158 | 6/1962 | Mueller | 164/53 X |
| 3,072,981 | 1/1963 | Davidson | 249/201 X |
| 3,178,783 | 4/1965 | Ednell | 249/106 |
| 3,239,187 | 3/1966 | Daley | 249/197 X |

FOREIGN PATENTS OR APPLICATIONS

| | | | |
|---|---|---|---|
| 1,315,675 | 12/1962 | France | 249/201 |
| 525,428 | 5/1956 | Canada | |
| 930,244 | 7/1963 | United Kingdom | |

*Primary Examiner*—Robert D. Baldwin
*Attorney, Agent, or Firm*—Wolfe, Hubbard, Leydig, Voit & Osann, Ltd.

[57] ABSTRACT

*A hot top especially adapted for use with ingot molds. The hot top includes a supporting casing having transversely concave inner side walls which are inclined in the longitudinal direction so that the central opening formed by the casing increases progressively in cross sectional area in the downward direction. The inner side walls are lined with a plurality of preformed refractory boards which are transversely curved more than the concave inner side walls of the casing, with the longitudinal edges of adjacent boards in bearing engagement with each other so that upon expansion of the boards due to the heat of the molten metal the refractory liner is expanded into tight engagement with the concave side walls of the casing. The refractory boards are also tapered in the longitudinal direction, and the longitudinal edges of the board are beveled so that the boards can be wedged tightly together along the inner side walls of the casing. A refractory bottom ring is secured to the lower end of the casing to prevent the spread of molten metal between the inner surface of the casing and the refractory liner. In one example, the bottom ring forms inner surfaces which are complementally curved with the inner surfaces of the casing and flush therewith so as to form four side walls extending all the way to the lower surface of the bottom ring. In another example, the refractory liner includes an outwardly extending flange on the lower end thereof for engaging the lower end of the metal casing to prevent the molten metal from contacting the casing.*

10 Claims, 10 Drawing Figures

Inventors
Fred Eastwood,
John Harry Brindle &
Frederick L. Kolb Jr.
By
Wolfe, Hubbard, Voit & Osann
Attys.

Inventors
Fred Eastwood,
John Harry Brindle &
Frederick L. Kolb Jr,
By
Wolfe, Hubbard, Voit & Osann.
Attys.

Inventors
Fred Eastwood,
John Harry Brindle &
Frederick L. Kolb Jr.
By
Wolfe, Hubbard, Voit & Osann.
Attys.

HOT TOP FOR BIG-END-UP INGOT MOLDS AND METHOD OF ASSEMBLING SAME

Matter enclosed in heavy brackets [ ] appears in the original patent but forms no part of this reissue specification; matter printed in italics indicates the additions made by reissue.

---

This invention relates generally to hot tops and, more particularly, to an improved reusable hot top for use with big-end-up ingot molds and an improved method of hot-topping.

In the casing of metal ingots it is common practice to use a hot top mounted on or at the top of an ingot mold. The hot top may be one of many types as described later but the object of a hot top is to contain feed metal and maintain it molten while the metal in the ingot mold is solidifying. The metal in the hot top is above and in contact with the metal in the ingot mold and as the metal in the got mold shrinks the metal contained within the hot top, that is to say, the feed metal or head metal, feeds down into the ingot body and thus prevents the formation of shrinkage cavities in the body of the ingot.

Of the various types of hot tops commonly used, probably the three most common are: (1) the single use refractory hot tops; (2) the reusable semi-permanent hot tops, generally including a metal casing with a semi-permanent refractory lining; and (3) the single use exothermic hot tops.

Our invention is primarily concerned with the second of these types, i.e., reusable hot tops which have heretofore consisted of a metal shell having a semi-permanent insulating lining of substantial thickness and with a protective refractory coating on the inner surface of the semi-permanent lining and which are for use on big-end-up ingot molds. These hot tops are generally floating hot tops which are inserted in the upper part of the ingot mold, and supported by wooden blocks mounted on the ingot mold, until the metal is poured. Big-end-up ingot molds are ingot molds in which are produced metal ingots wider at the top than the bottom. With big-end-up molds, removal of the solidified ingot may present a difficulty, whereas with big-end-down ingots, i.e., those which are wider at the bottom than at the top, there is no problem as the mold is simply lifted off the solidified ingot. With big-end-up molds, the mold cannot be lifted off the ingot unless the mold and ingot are first inverted, a technique generally regarded as inpracticable with the larger sizes of ingot. An alternative method of removing the ingot from the mold is to grasp the upper part of the ingot (the residual feeder head) by stripper tongs, and by lifting from above, thus the ingot is removed from the mold. In view of the dead weight to be lifted, the amount of feeder head available to be grasped by the stripper tongs is important, as a certain minimum is required to enable a good grip to be obtained. With the usually employed refractory lined metal boxes, the hot top volume is such as to insure that a reasonably high residual head is left.

Improvements in such hot tops will generally be aimed at saving head metal providing this can be done with no adverse effects. However, the only way of saving head metal is to reduce the volume of head metal used, and this can be done only by reducing the height or diameter of the head or both.

When using refractory lined metal head boxes or single use refractory or insulating hot tops there is, in normal circumstances, always a danger that if the diameter of the head is reduced, the metal at the lower end of the hot top at the junction with the ingot body may freeze to form a bridge which will prevent the liquid metal in the hot top feeding down into the solidifying ingot body. Thus, the ingot will contain shrinkage cavities. For this reason when using hot tops which are more thermally efficient than straight insulators, e.g., exothermic hot tops, and which allow for reduction in the hot top volume, one generally reduces the height of the feeder head rather than the diameter. Unfortunately, however, when the height is reduced the resultant feeder head is too short to be gripped by the stripper tongs and so the big-end-up ingots cannot be easily extracted from the mold, unless expensive bottom strippers are employed which push the ingot upwards a sufficient distance to enable the stripper tongs to gain a grip.

Another disadvantage of the refractory lined metal head boxes used heretofore has been the disadvantage of the low reuse rate, i.e., the turn-around time has been very long. This is due to the fact that after being used the hot top lined with semi-permanent refractory lining has to be renovated. This involves the periodic replacement of the semi-permanent refractory lining itself, after being used a relatively small number of times and, in addition, a slurry must normally be applied to the face of the semi-permanent liner, after each use, to replace the protective refractory coating. Such work can only be done when the hot top has cooled sufficiently to be handled. Because of the low rate of cooling of the refractory lined head box, due in a large way to the large heat content of the head boxes when they are removed from the ingot mold, the reuse rate is commonly as low as 1.2 times per twenty-four hour period. This necessitates having a large number of head boxes available for use while the others are cooling and being renovated. It should be pointed out that after renovation by the slurrying method, the semi-permanent refractory lining and facing coating have to be thoroughly dried before the head box can be reused, which is an extremely time-consuming operation. Thus, the use of such head boxes necessitates the outlay of large amounts of capital for the purchase of the large number of head boxes required, a large amount of floor space is required both for storage and for repair and renovation of the head boxes, and also a considerable amount of manpower is required both in handling and repair and renovation of such head boxes.

*Hot tops known in the prior art include those shown in Edmonds et al. U.S. Pat. No. 2,925,637, which discloses composite liners composed of tiles which are either flat to conform with straight walls of a mold or head box or curved to conform with a cylindrical mold or head box, and in Funk et al. U.S. Pat. No. 3,159,887, which discloses exothermic inserts which are either flat for insertion in straight walls of a hot top or curved for insertion in a cylindrical hot top.*

It is a primary object of the present invention to provide an improved reusable hot top, for use on big-end-up ingot molds, which as a reduced gross hot top volume compared to those used heretofore but which at the same time has a residual head high enough to facilitate the stripping of solidified ingots from big-end-up ingot molds and can be reused with substantially greater frequency than the commonly used refractory lined metal head boxes.

It is a further object of the invention to provide such an improved hot top which maintains a relatively high head on the upper end of a big-end-up ingot while decreasing considerably the gross volume of the hot top and without any danger of bridging at the lower end of the hot top during solidification of the main body portion of the ingot.

It is another object of the invention to provide an improved hot top of the foregoing type which provides good thermal insulation of the head metal during the solidification of the ingot yet which cools so rapidly after stripping from the solidified ingot that it can be used more frequently than heretofore.

Yet another object is to provide such a hot top which can be artificially cooled, such as by quenching with water or air blast, after it has been stripped from the solidified ingot.

It is a further object of the invention to provide a reusable top hot for use with big-end-up ingot molds which prevents the spread of molten metal behind the insulating refractory lining of the hot top. A related object is to provide such a hot top in which the life of the metal head box is substantially extended. Yet a further object of the invention is to provide a reusable hot top which does not require the use of semi-permanent refractory linings of brick or castable refractory.

Still another object of the invention is to provide an improved method of assembling hot tops for use with big-end-up ingot molds, this method being so simple and economical that it substantially reduces the manpower and time required for the hot top assembling operation. Another object is to provide such a method which, if desired, does not require cutting or trimming of the refractory lining material to achieve the desired tight fit.

A still further object of the present invention is to provide an improved hot top of the type described which reduces the amount of consumable lining material to be replaced in the hot top between uses.

Another object of the present invention is to provide an improved hot top for use with big-end-up ingot molds which permits the use of preformed refractory liners without any danger of such liners being bowed inwardly away from their supporting surfaces due to the heat of the molten metal. A related object is to provide an improved hot top which actually utilizes the heat from the molten metal being poured to insure that the various elements of the hot top liner are in tight engagement with each other and their supporting surfaces.

Other objects and advantages of the invention will become apparent upon reading the following description and appended claims, and upon reference to the drawings, in which:

While the invention will be described in connection with certain preferred embodiments, it is to be understood that the invention is not to be limited to the disclosed embodiments, but on the contary, it is intended to cover the various modifications and equivalent arrangements included within the spirit and scope of the appended claims.

The steel manufacturer, over the years, has been constantly striving for improvements in ingot soundness while at the same time seeking to effect economies of operation. Once the consistent production of sound ingots had been achieved by reason of various inprovements in hot-topping techniques including, for example, improved insulations and hot top designs, emphasis quite naturally shifted to maximizing the yields of useful ingot metal, i.e., reducing to as low as possible the excess metal poured in the feeder head. Big-end-up ingot molds, constituting by far the most widely used molds in the United States, have certain inherent characteristics which have, until now, substantially resisted efforts to combine low hot top volume with top-lifting techniques. By means of the hot tops of the present invention, however, this has now been achieved and, moreover, the turn-around time for each hot top, i.e., the time between successive uses of any one hot top, has been remarkably shortened so as to permit as much as 500% greater utilization of each permanent hot top casing.

Reusable hot tops of the type which include a semi-permanent lining, as noted above, have a number of disadvantages including relatively low reuse rate and/or low efficiency in terms of the percentage volume of feeder metal to ingot metal. Efforts to improve the yields obtainable therewith have generally resulted in residual heads of such reduced height as to prohibit their effective use with big-end-up ingot molds and top-lifting techniques.

With the improved hot top of the present invention, the residual feeder head is sufficiently high to permit top-lifting of big-end-up ingots, and yet the gross volume of metal poured is about the same as that required with the most efficient hot tops now in use, and the hot top can be reused in a fraction of the time heretofore required.

In short, the instant invention comprises an outstanding improvement in the field of reusable hot tops of the type heretofore including a semi-permanent refractory liner whereby the same can be applied to big-end-up ingots which are stripped by top-lifting techniques, while at the same time achieving substantial economic advantages. These very substantial advantages, when coupled with the ability to actually multiply the number of uses of a given hot top in a twenty-four hour period, render the present invention one of obvious commercial significance.

Figure 1:
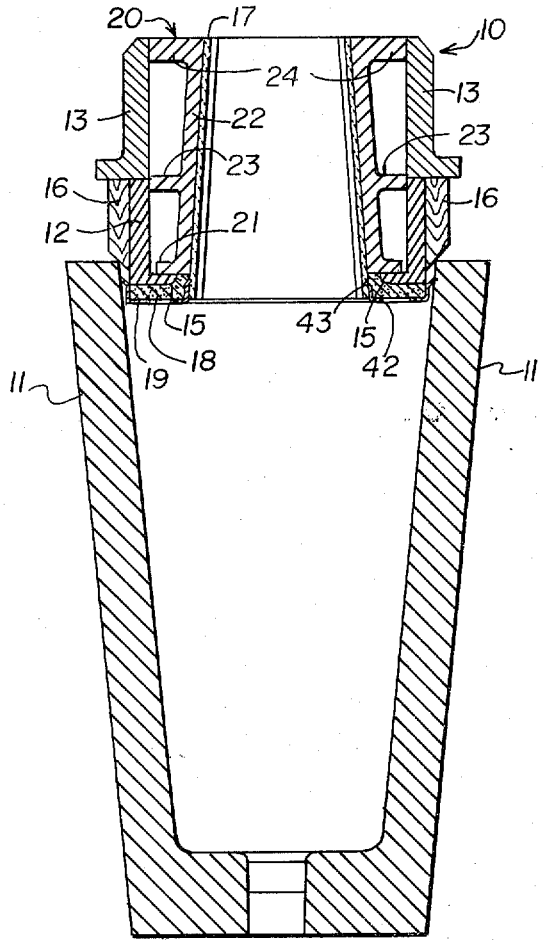
FIG. 1 is an elevation view in section showing a hot top embodying the present invention mounted on the top of a big-end-up ingot mold.

Turning now to the drawings, in FIG. 1 there is shown a hot top 10 mounted on the top of a big-end-up ingot mold 11, such as used in the formation of steel ingots for example. The hot top serves to delay the solidification of the metal contained within it so that molten metal can feed downwardly into the main body portion of the metal ingot to compensate for shrinkage during cooling, thereby preventing the formation of shrinkage cavities in the final ingot.

Figure 3:
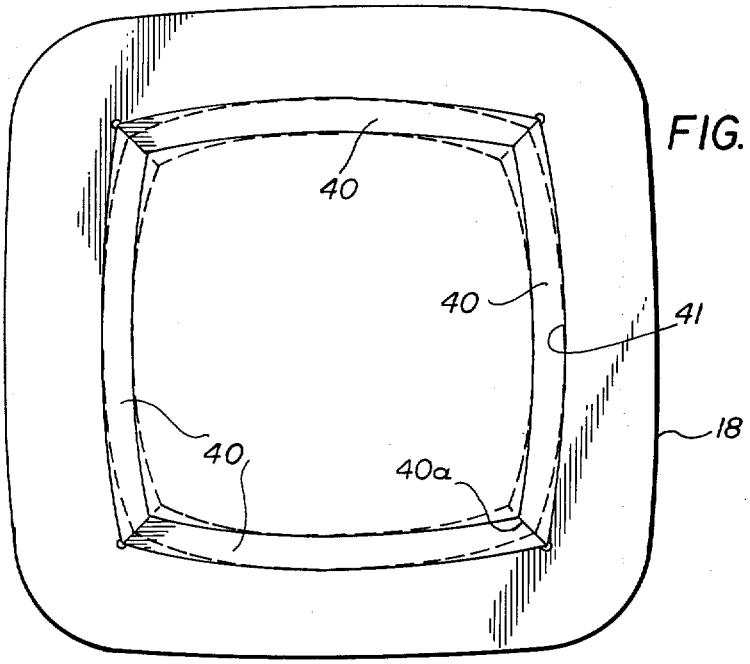
FIG. 3 is a bottom plan view of the entire hot top shown in FIG. 2 with the broken line showing the positions of the refractory liner boards prior to being rammed home.

In the particular embodiment illustrated, the hot top 10 includes a conventional outside metal casing composed of a lower section 12 and an upper section 13 resting on the top of the lower section and rigidly connected thereto. The lower section 12 of the metal casing is complementally formed with respect to the inside walls of the ingot mold 11, and is provided with an inturned flange 15 extending entirely around the lower end thereof. For the purpose of initially mounting the metal casing on the lip of the big-end-up mold 11, a plurality of wooden spacing blocks 16, which may be adjusted to control the depth of the lower end of the hot top within the mold, are initially provided between the lower metal section 12 and the walls of the mold cavity. These wooden blocks 16 are subsequently removed, after the charge of molten metal has been poured into the mold and hot top, and the hot top thereafter floats on the molten metal in the mold. Although the particular hot top illustrated is of generally quadrangular configuration, as can be seen in FIG. 3, it will be understood that the shape of the hot top may be round, oval, polygonal, or any other desired configuration.

To provide the thermal insulation required to delay the solidification of the molten metal in the hot top, the hot top is lined with a thin refractory liner 17 having low thermal conductivity, and a refractory bottom ring 18 is usually secured to the lower end of the metal casing for the purpose of preventing the creepage of molten metal up behind the refractory liner end to protect the lower end of the metal casing. The refractory bottom ring 18, which may be a sand ring for example, is complementally formed with respect to the walls of the mold cavity, being fluted in the case of a fluted mold. A conventional wiper strip 19 is fitted over the lower outside corner of the ring 18 extending entirely around the hot top with the upper end of the wiper strip bearing against the mold wall to prevent the molten metal from rising in the gap between the hot top and the mold. In order to hold both the refractory bottom ring 18 and the wiper strip 19 to the metal casing, a plurality of spring clips 19a are fitted over the wiper strip around the hot top with their lower ends gripping the ring 18 and their upper ends hooked in recesses provided in the lower casing section 12.

In accordance with one aspect of the present invention, the hot top casing includes an inner metal sleeve embodying an essentially vertical, inner metal face defining a reservoir for molten metal, with the preformed refractory liner in bearing engagement with the inner surface of the metal sleeve. Rapid cooling of the hot top after it has been stripped from the solidified ingot results from the absence of the semi-permanent liner. In order to facilitate removal of the solidified ingot from the big-end-up mold while maintaining a low gross hot top volume, the opening at the lower end of the hot top must be between about 25 and about 45 percent of the area of the mold opening so as to form a relatively high residual feeder head on the upper end of the ingot. To prevent freezing over of the molten metal at the lower end of the hot top during solidification of the main body portion of the ingot, the preformed refractory liner is made of a highly thermally insulating composition of finely divided refractory material, an organic fibrous material, and a binder.

The present invention stems in part from the unexpected discovery that when using certain highly efficient insulating liners, the cross-sectional area of the hot top opening can be considerably reduced even though the liner is maintained in direct contact with a metal casing. This enables a high residual feeder head to be produced on the top of the ingot while decreasing the gross hot top volume so that the ingot can be readily gripped by the stripping tongs, while at the same time permitting extremely fast cooling of the hot top (after it has been stripped from the solidified ingot) due to the high thermal conductivity and reduced heat capacity of the metal shell in the absence of semi-permanent lining. this is believed to be a heretofore unachieved combination of properties in a single hot top, and is of extreme economic importance in practice.

Figure 2:
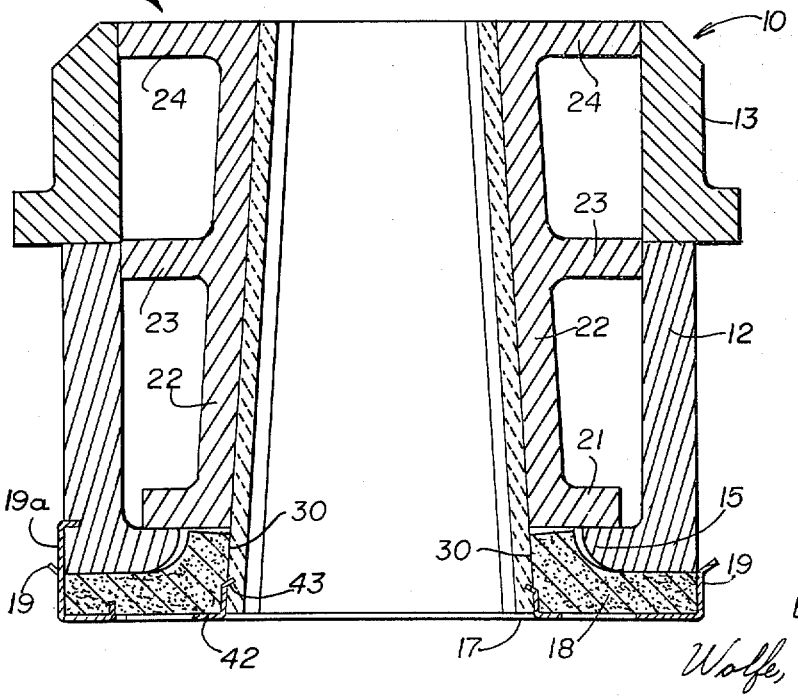
FIG. 2 is an enlarged sectional view of the hot top shown in FIG. 1.

In the particular embodiment illustrated in FIGS. 1 and 2, a metal sleeve 20, made of cast iron, for example, is inserted concentrically within the conventional casing sections 12 and 13, with the lower end of the metal sleeve 20 being provided with an outwardly extending flange 21 which rests on top of the inner flange 15 on the lower casing section 12. To provide a maximum area of support for the refractory lining 17, the metal sleeve 20 is provided with a solid body portion 22 which covers the entire outer surface of the upper portion of the refractory liner. The metal sleeve 20 is maintained in the desired space relation with respect to the outside casing sections by a pair of outwardly extending flanges or ribs 23 and 24 which are complementally formed with the inside surfaces of the two casing sections 12 and 13, respectively. A longitudinal stress relief groove is provided in each corner of the metal sleeve to prevent thermal cracking. It is apparent that many other forms for the metal sleeve may be devised in accordance with the teachings of this invention, and the metal sleeve may be supported within the outside casing sections in a number of different ways.

It has been found that as a result of the relatively lower heat capacity of the metal sleeve 20 after it has been stripped from the solidified ingot, the average hot top embodying this invention may be used as often as four to six times in each twenty-four hour period, thereby providing as much as a 500 percent increase in hot top usage, as compared with the normal resue rate of approximately 1.2 times per twenty-four hour period for the commercial hot tops employed heretofore. This not only reduces the number of hot tops required, but also leads to attendant reductions in floor space and manpower requirements. In one example of this invention in a large scale operation, it was found that hot tops constructed in accordance with this invention cooled to the temperature necessary to permit replacement of the consumable refractory liner in about 1.5 hours after stripping, whereas the type of hot tops previously employed in this application required about 3.5 hours to cool to the same temperature. An improvement of this magnitude is obviously of great significance in any commercial operation. Also, using the new hot top of our invention, the hot top is immediately ready for use after it has been re-lined, whereas with the conventional refractory lined metal head box, a further time-consuming drying operation is required after the box has been re-lined before the hot top can be re-used.

In accordance with another aspect of this invention, the rapid cooling rates described above are achieved in a hot top in which the maximum cross-sectional area of the hot top opening is between about 25 and about 45 percent preferably about 25 to 35 percent, of the area of the mold openings. Consequently, the gross hot top volume is decreased while producing a relatively high feeder head on the top of the ingot, thereby permitting the big-end-up ingot to be readily gripped from above by a pair of tongs for removing the ingot from the mold, without the use of bottom strippers. It is believed that this is the first time that such tall feeder heads have been produced on sound ingots with such a low hot top volume, while at the same time permitting rapid cooling of the hot top between uses. In one large scale example of the present invention, the openings at the lower ends of the hot tops were only about 28 percent of the area of the openings of the big-end-up molds with which they were used, compared with openings of about 56 percent in the refractory lined metal head boxes which were previously used with the same molds. This difference is especially significant when one considers that it becomes difficult to remove big-end-up ingots from their molds, without seriously increasing the percentage hot top volume, when the opening at the lower end of the hot top is greater than about 45 percent of the area of the mold opening.

In order that the area of the hot top opening may be reduced as described, it is essentially that the refractory liner be sufficiently thermally insulating to prevent freezing over or solidification of the relatively narrow column of molten metal therein during solidification of the main body portion of the ingot. To provide the required thermal insulation, the refractory liner material should have a mean heat diffusivity value over the temperature range of 25° C to 1500° C of below about 0.015 centimeter-gram-second units. The term "heat diffusivity" is defined as $\sqrt{Kc\rho}$ wherein K is the thermal conductivity of the material, $\rho$ is the density, and c is the specific heat. Suitable highly thermally insulating compositions for the refractory liner are those containing by weight about 70 to 95 percent finely divided refractory, such as sand, grog, or the like; about 2 to 20 percent organic fibrous material, such as wood pulp or paper pulp for example; and about 1 to 10 percent a binder such as a resin or an organic glue. In some cases, it is desirable also to include up to about 10 percent by weight of an inorganic fibrous material, such as glass wool, rock wool, asbestos, steel wool, or the like, to render the liner slightly flexible or deformable. The particular composition and thickness of the liner may be chosen to provide the required thermal insulation for any given application. Refractory liners having compositions as described above are commercially available, and are generally formed by preparing an aqueous slurry of the particular composition, depositing the slurry of a porous mold, consolidating the solid part of the slurry, preferably under pressure or vacuum, to remove the liquid vehicle, and then baking or curing the remaining material. The thickness of the preformed refractory liner can vary for different applications, but in general it should not exceed about 1.5 inches.

Figure 6:
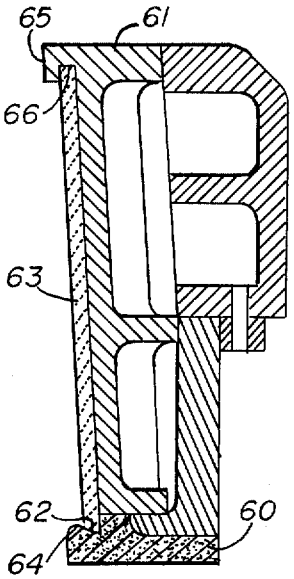
FIG. 6 is an elevation view in section of one side of another hot top embodying the present invention, but employing a different construction at the lower inside corner of the hot top.
Figure 7:
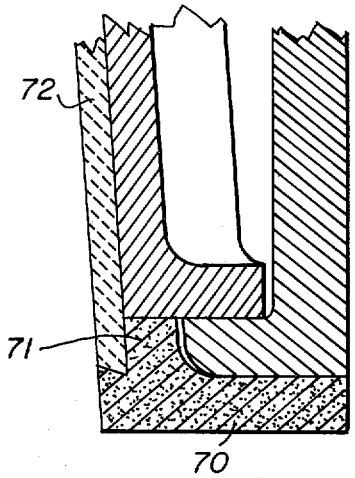
FIG. 7 is a fragmentary elevation view in section of the lower portion of one side of another hot top having a further modified construction at the lower inside corner.

In accordance with a further aspect of the invention, the inner side walls of the thermally conductive metal casing are inclined downwardly and outwardly to provide a gradually increasing hot top opening, and the refractory bottom ring is provided with complemental inner surfaces which are flush with the inner surfaces of the metal casing and inclined at the same angle. The preformed refractory liner can then be inserted down into the hot top opening, with the hot top in its inverted position, until it is wedged firmly against the inclined inner side walls with the upper end of the liner extending preferably to the uppermost surface of the bottom ring on the inverted assembly but in any event substantially beyond the juncture between the sand ring and the metal sleeve. This has been found to greatly facilitate the installation of the preformed refractory liner, without the necessity for supplemental cutting and trimming operations, and effectively prevents the penetration of molten metal behind the refractory liner. Thus, in the present embodiment of FIGS. 1 and 2, the sand ring 18 extends inwardly beyong the flange 15 on the lower end of the casing section 12, and extend upwardly past the inner edge of the flange 15 into abutting engagement with the lower end of the metal sleeve 20. The inside portion of the refractory bottom ring 18 is provided with inclined surfaces 30 which are coplanar with the inner surfaces of the metal sleeve 20. Consequently, when the hot top is in its inverted position with the larger end of the opening at the top, it is a simple matter to insert the preformed refractory liner 17 downwardly over the continuous inner side walls formed by the metal sleeve 20 and the bottom ring 18 until the liner has been wedged firmly into position. This is in contrast to other constructions where the preformed refractory liner is seated in a groove in the bottom ring, with the result that extensive cutting and trimming is required to fit the liner and bottom ring together to prevent creepage of molten metal therebetween. Moreover, in the present construction there is less tendency for gaps to form between the refractory liner and the bottom ring during pouring of the molten metal. In FIGS. 6 and 7 are shown embodiments of the invention which incorporate the key features therein but which would, of course, require a trimming operation.

Figure 3A:
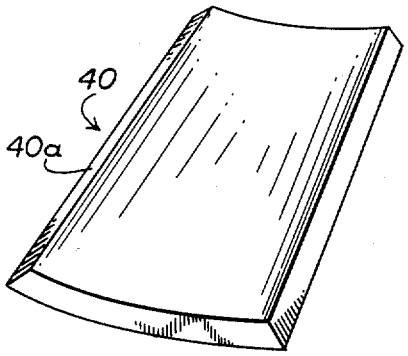
FIG. 3a is a perspective of one of the refractory liner boards employed in the hot top of FIGS. 1-3.

For the purpose of facilitating manufacture, shipping, and storage of the preformed refractory liner, the liner is preferably formed from a plurality of preformed boards, such as the four boards 40 shown in FIGS. 3 and 3a. Each of the boards 40 is of generally rectangular shape, as shown in FIG. 3a, and is provided with beveled longitudinal side edges 40a adapted to form tight joints between adjacent boards when they are assembled in the hot top. The boards are slightly tapered in the transverse direction so as to be complementally formed with respect to the side walls of the metal sleeve 20 and the bottom ring 18, so that the boards have a natural wedging action as they are inserted within the hot top. With the hot top in its inverted position, the four boards 40 can be simply inserted down along the four side walls formed by the metal sleeve 20 and the refractory bottom ring 18 until the longitudinal edges of the adjacent boards abut each other. The boards are then forced downwardly until they are wedged tightly together against the inner side walls, with the upper ends of the boards extending at least to the uppermost surface of the bottom ring on the inverted assembly.

In accordance with one aspect of the invention, both the preformed refractory liner and the inner side walls formed by the metal casing and the refractory bottom ring are transversely concave so that any expansion of the refractory liner due to the heat from the molten metal causes the liner to bow outwardly rather than inwardly. This not only wedges the liner more firmly in place, but also insures against the upward creepage of molten metal between the inner surface of the metal casing and the refractory liner by preventing the liner from buckling or bowing away from the supporting metal casing. Moreover, to insure against any breakage of the refractory liner due to thermal expansion, each of the preformed refractory boards is initially curved slightly more in the transverse direction than the concave inner surfaces of the metal casing and the bottom ring so that the longitudinal edge portions of the boards are initially spaced away from the corner portions of the inner side walls. Thus, referring to FIG. 3, each of the four generally rectangular inner side walls 41 of the metal sleeve 20 and the bottom ring 18 is transversely concave so as to receive four generally complementally curved refractory boards 40. As indicated by the broken lines in FIG. 3, the boards 40 are initially curved slightly more than the inside surfaces of the metal sleeve 20 so that the abutting longitudinal edge portions of the boards are slightly spaced from the corners of the metal sleeve. A 2 to 50° clearance between the boards and the metal sleeve is suitable for most applications. Since the adjacent boards 40 are initially in abutting engagement with each other, they are forced back against the side walls 41 by the wedging actions between boards as they are rammed home. Any subsequent thermal expansion of the boards due to the heat from the molten metal causes them to tend to straighten out, thereby insuring a tight fit between adjacent boards and the supporting side walls and, conversely, preventing the boards from buckling or bowing away from the inner side walls.

In general, the wedging action between the preformed refractory boards 40, and the frictional engagement of the boards with the inner surfaces of the metal casing and the refractory bottom ring, is sufficient to hold the refractory liner firmly in place during pouring of the molten metal. However, to further insure against slipping of the boards downwardly when the hot top is rotated into the normal casting position, a metal wiper ring 42, shown in FIG. 2, having a serrated inner edge 43 may be mounted on the inside corner of the refractory ring 18 prior to the insertion of the refractory boards. When the liner boards are subsequently inserted into the hot top, the serrated edge 43 penetrates into the material of the boards and provides a positive retaining action to hold the boards firmly in position. Alternatively, the preformed liner boards may be held in place by various arrangements of clips, straps, wire or the like.

Figure 4:
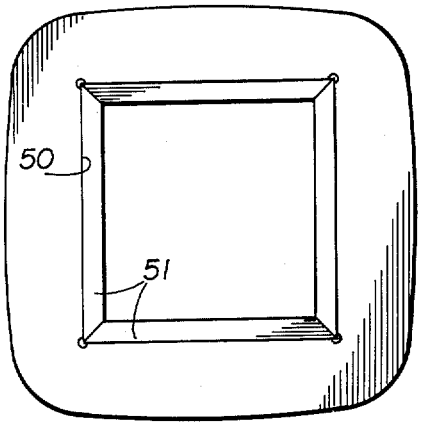
FIG. 4 is a horizontal section of a modified arrangement for the refractory liner boards in the hot top of FIGS. 1 and 2.
Figure 5:
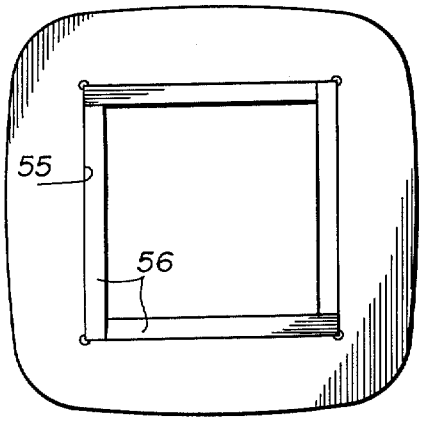
FIG. 5 is a horizontal section of another modified arrangement for the refractory liner boards in the hot top of FIGS. 1 and 2.

Although the invention has been described thus far only in connection with curvilinear arrangement for the metal casing and the refractory liner, it will be understood that the invention is equally applicable to other shapes for the refractory liner. Thus, in the modified construction illustrated in FIG. 4, the inner side walls 50 formed by the metal casing and the refractory bottom ring are perfectly flat so as to receive a plurality of flat liner boards 51. The abutting edges of adjacent boards are beveled to form 90-degree corner angles in the final assembly. In another modified construction, illustrated in FIG. 5, the inner side walls 55 are still flat, but the refractory liner boards 56 are simply butted up against each other to form the desired square corner construction without beveling the longitudinal edges of the boards. In still another embodiment of the invention, the four preformed boards or slabs are designed to be spaced apart at adjacent longitudinal edges, and four corner wedges are fitted down between each pair of adjacent boards to urge them firmly against the supporting metal wall. The corner wedges are, of course, made of the same type of refractory material as the four boards, and are provided with longitudinal edges which are complemental to those of the boards. A further embodiment of the invention utilizes a refractory liner which is preformed in one piece adapted to fit within the desired casing structure. This one-piece liner is most useful with relatively small ingots.

In accordance with one modified embodiment of the invention, there is provided a refractory bottom ring having an inner portion adapted to extend beyond the inner surface of the refractory liner so as to define a circumferential groove for receiving and seating the lower end of the refractory liner, and with a vertically extending rim being provided on the inner periphery of the bottom ring for engaging a lower portion of the inner surface of the refractory liner for preventing the creepage of molten metal between the bottom ring and the lower end of the liner. Thus, in FIG. 6, a portion of the refractory bottom ring 60 extends inwardly beyond the inner surface of the metal sleeve 61 so as to form a circumferential groove 62 which receives and seats the preformed refractory liner 63. For the purpose of preventing the penetration of molten metal between the liner 63 and the bottom ring 60, the inner periphery of the bottom ring is provided with a vertically extending rim 64 which extends upwardly into bearing engagement with a lower portion of the inner surface of the refractory liner. To hold the refractory liner 63 down against the bottom ring 60, the metal sleeve 61 in this embodiment of the invention is provided with an inwardly extending flange 65 which defines a circumferential groove 66 adapted to receive the upper end of the refractory liner. Consequently, the refractory liner 63 is clamped firmly in position between the upper end of the metal sleeve 61 and the lower portion of the refractory bottom ring 60.

In a further modified embodiment illustrated in FIG. 7, the construction is similar to that of FIG. 6 except that the refractory bottom ring 70 in this case terminates flush with the inner surface of the refractory liner 72. Thus, the refractory liner overlaps only the upper portion 71 of the bottom ring 70, and there is no vertical rim engaging the inner surface of the refractory liner. It will be appreciated that in each of these constructions the refractory liner is in bearing engagement with the inner surface of a metal casing, and that the lower end of the hot top opening is between about 25 and about 45 percent of the area of the mold opening.

Figure 8:
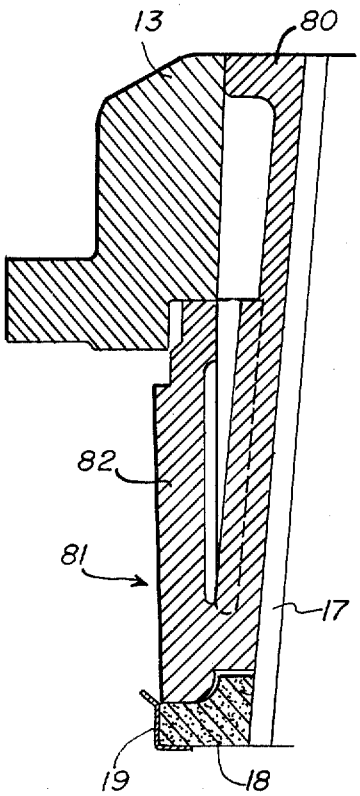
FIG. 8 is an elevation view in section of one side of the hot top embodying the present invention and which permits the replacement of the lower portion of the conventional outside casing.

In accordance with one aspect of the present invention, the metal sleeve which engages the refractory liner is adapted to also serve as the lower section of the conventional outside metal casing. Thus, as shown in FIG. 8, the J-shaped metal sleeve 80 is provided with a lower portion 81 having an outer leg 82 supporting the upper section 13 of the conventional metal casing. Since there is no joint between the metal sleeve and the lower casing section in this construction, there is less opportunity for the penetration of molten metal between the various elements of the hot top. The remainder of this embodiment is similar to that described above in connection with FIGS. 1 through 3. It will be appreciated that the outside portion of the metal sleeve 80 could be extended even further to replace the upper section 13 of the metal casing as well as the lower section.

As will be apparent from the foregoing descriptions, the term "casing" as employed in the appended claims is a generic term which may include the combination of a conventional two-section metal casing with a metal sleeve inserted therein (FIG. 1), the combination of the upper section of a conventional metal casing with a metal sleeve which is specially formed to replace the lower section of the conventional casing (FIG. 8), a single monolithic metal casing in direct engagement with the refractory liner, or any other equivalent arrangement.

Figure 9:
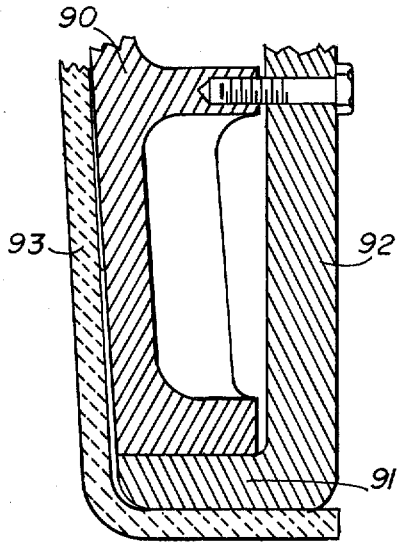
FIG. 9 is a fragmentary elevation view in section of a modified hot top construction in which the refractory bottom ring has been eliminated.

If desired, the hot top of the invention can be further simplified by eliminating the refractory bottom ring, as illustrated in FIG. 9. In this construction, the inner surface of the metal sleeve 90 is flush with the inner edge of the bottom flange 91 on the outside casing section 92, and the lower portion of the preformed refractory liner 93 curves around the bottom of the flange 91 to prevent the molten metal from contacting the metal casing and/or the metal sleeve. This construction is especially useful in cases where the refractory liner 93 is formed in one piece rather than in a plurality of boards. Although this embodiment is illustrated with the use of a separate metal sleeve 90, it will be understood that the metal sleeve 90 and the lower outside casing section 92 could be a single integral structure, as illustrated in FIG. 8. Furthermore, it is contemplated that the metal sleeve could be extended even further to replace the upper outside casing section, as mentioned above, so that the entire hot top would consist solely of a monolithic metal casing and the preformed refractory liner. Of course, in any of these constructions it is essential that the preformed refractory liner be in direct engagement with a metal casing and that the lower end of the hot top opening be between about 25 and about 45 percent, preferably about 25 to 35 percent, of the area of the mold opening.

From the foregoing detailed discussion, it can be seen that the present invention provides an improved hot top which facilitates the stripping of solidified ingots from big-end-up ingot molds while attaining a low gross hot top volume, and which can be reused considerably more frequently than the hot tops employed heretofore. The hot top of this invention provides good thermal insulation during the pouring and freezing of the ingot, so that there is not danger of the molten metal freezing over at the bottom of the hot top, and yet cools so rapidly after it has been stripped from the frozen ingot that it can be reused as often as four to six times in a twenty-four hour period. Moreover, since no semi-permanent lining material is employed, the hot top can be artificially cooled, such as by quenching with water or air blasts, after it has been stripped from the frozen ingot to further increase the reuse rate. This invention also provides an improved method of assembling hot tops by simply inserting preformed refractory liner boards down over the coplanar surfaces provided by the flush-fitting bottom ring and metal sleeve, thereby achieving the desired tight fit without any cutting or trimming of the refractory lining. Furthermore, because of the small area of the hot top opening, this invention reduces the amount of consumable lining material to be replaced in the hot top between uses. In the embodiment employing the curved liner boards and concave supporting surfaces, the preformed refractory liners can be used without any danger of being bowed inwardly away from their supporting surfaces due to the heat of the molten metal. In fact, the heat from the molten metal is actually utilized to force the liner boards into tighter engagement with each other and the supporting metal sleeve.

We claim as our invention:

1. A low volume, rapid turn-around hot top especially adapted for use with a big-end-up ingot mold having a top opening of a predetermined cross-sectional area comprising, in combination, a metal casing adapted to be mounted on the top of a big-end-up mold, the inside surface of said metal casing being inclined downwardly and outwardly to provide a gradually increasing hot top opening, a refractory bottom ring secured to the lower end of said metal casing with the *entire* inside surface of said ring being substantially flush with the inside surface of said metal casing and tapered at the same angle, and an expandable, highly insulating refractory liner comprising a plurality of preformed refractory boards fitted within said metal casing in bearing engagement with the inclined surfaces thereof *and wedged tightly together against the inside surface of said casing with the longitudinal edges of said boards abutting each other*, the lower portions of said boards extending downwardly in bearing engagement with the inner surfaces of said bottom ring to substantially prevent the spread of molten metal upwardly therebetween.

2. A hot top especially adapted for use with ingot molds comprising, in combination, a supporting casing adapted to be mounted on the upper end of the ingot mold and having a plurality of transversely concave inner side walls *which are inclined in the longitudinal direction so that the central opening formed thereby increases progressively in cross-sectional area in the downward direction*, a preformed refractory liner comprising a plurality of transversely curved refractory boards in bearing engagement with the transversely concave inner side walls of said casing, *said refractory boards being transversely curved more than the concave inner side walls of said casing with the longitudinal edges of adjacent boards in bearing engagement with each other whereby upon expansion of said boards due to the heat of the molten metal said refractory liner is expanded into tight engagement with the concave side walls of said casing, said refractory boards also being tapered in the longitudinal direction and wedged tightly together along the inner side walls of said casing*, and a refractory bottom ring secured to the lower end of said casing to substantially prevent the spread of molten metal between the inner surface of said casing and said refractory liner.

3. A hot top especially adapted for use with ingot molds comprising, in combination, a supporting casing adapted to be mounted on the top of the ingot mold and having a plurality of transversely concave inner side walls, a refractory liner comprising a plurality of preformed refractory boards fitted against the concave inner side walls of said casing, said refractory boards being transversely curved more than the concave side walls of said casing with the longitudinal edges of adjacent boards in bearing engagement with each other whereby upon expansion of said boards due to the heat of the molten metal, said refractory liner is expanded into tight engagement with the concave side walls of said casing, and a refractory bottom ring secured to the lower end of said casing to substantially prevent the spread of molten metal between the inner surface of said casing and said refractory liner.

4. A hot top especially adapted for use with ingot molds comprising, in combination, a supporting casing adapted to be mounted on the top of the ingot mold, a refractory bottom ring secured to the lower end of said casing to substantially prevent spread of molten metal along the inner surfaces of said casing, said casing and said bottom ring being formed to provide a plurality of transversely concave inner side walls, *the inside surface of said bottom ring being substantially flush with the inside surface of said casing so that said concave inner side walls extend* [ extending ] to the lower surface of said bottom ring, and a preformed refractory liner comprising a plurality of transversely curved refractory boards in bearing engagement with the transversely concave inner side walls formed by said casing and said bottom ring.

5. A hot top especially adapted for use with ingot molds comprising, in combination, a supporting casing adapted to be mounted on the top of the ingot mold, a refractory bottom ring secured to the lower end of said casing to substantially prevent the spread of molten metal along the inner surfaces of said casing, said casing and said bottom ring being formed to provide a plurality of transversely concave inner side walls, and a refractory liner comprising a plurality of preformed refractory boards fitted against the transversely concave inner side walls formed by said casing and said bottom ring, said refractory boards being transversely curved more than said side walls with the longitudinal edges of adjacent boards in bearing engagement with each other whereby upon expansion of said boards due to the heat of molten metal said refractory liner boards are expanded into tight engagement with each other and said concave side walls rather than bowing away from said side walls.

6. A hot top especially adapted for use with ingot molds comprising, in combination, a generally quadrangular supporting casing adapted to be mounted on the top of the ingot mold, the inner surface of each side wall of the metal casing being transversely concave, a refractory bottom ring secured to the lower end of said metal casing to substantially prevent the spread of molten metal along the inner surfaces of said casing, the inner surfaces of said bottom ring being complementally curved with the inner surfaces of said casing so as to form four transversely concave inner side walls extending to the lower surface of the bottom ring, and a refractory liner comprising four preformed refractory boards fitted against said concave inner side walls and extending at least to the lower surface of said bottom ring, said refractory boards being transversely curved more than the concave side walls with the longitudinal edges of adjacent boards in bearing engagement with each other whereby upon expansion of said boards due to the heat of the molten metal, said boards are urged firmly against said concave side walls with the longitudinal edges of the adjacent boards being wedged into tight engagement with each other.

7. A method of assembling a hot top especially adapted for use with ingot molds, said method comprising the steps of providing a supporting casing adapted to be mounted on the top of an ingot mold, the inner side walls of said casing being concave in the transverse direction and inclined in the longitudinal direction so that the center opening formed thereby increases progressively in the downward direction, inverting said casing so that the larger end of the opening is at the top, mounting a complementally formed refractory bottom ring on the upper end of the inverted casing with the inner surfaces of the bottom ring substantially flush with the inner surfaces of the casing so as to form a plurality of transversely concave inclined inner side walls, inserting a plurality of transversely curved and longitudinally tapered refractory liner boards downwardly along said inner side walls until the longitudinal edges of adjacent boards abut each other, and forcing the abutting boards downwardly until they are wedged tightly together against said inner side walls.

8. A method of assembling a hot top especially adapted for use with ingot molds, said method comprising the steps of providing a supporting casing adapted to be mounted on the top of an ingot mold, the inner surfaces of said casing being concave in the transverse direction and inclined in the longitudinal direction so that the central opening formed thereby progressively increases in cross-sectional area in the downward direction, inverting said casing so that the larger end of the opening is at the top, mounting a complementally formed refractory bottom ring on the upper end of the inverted casing with the inner surfaces of the bottom ring substantially flush with the inner surfaces of said casing so as to form a plurality of transversely concave and longitudinally inclined side walls, inserting a plurality of transversely curved and longitudinally tapered refractory liner boards downwardly along said inner side walls until the longitudinal edges of adjacent boards abut each other, and forcing the abutting boards downwardly until they are wedged tightly together, said boards being transversely curved more than said concave inner side walls whereby upon expansion of said boards due to the heat of molten metal said boards are urged firmly against each other and said side walls.

[ 9. For use in a hot top having a plurality of transversely concave inner side walls, a preformed refractory liner board which is tapered in the longitudinal direction and curved in the transverse direction more than said concave side walls, said board being made of a highly thermally insulating composition of finely divided refractory material, an organic fibrous material, and a binder. ]

[ 10. A low volume, rapid turn-around hot top which comprises, in combination, a reusable metal casing adapted to be supported on the upper end of an ingot mold with the lower end of the casing extending downwardly in overlapping relation with top portions of the inner side walls of the mold so that said casing floats on molten metal poured into said mold, said casing embodying an essentially vertical, inner metal face defining a reservoir for a feeder head of molten metal, and an expandable, preformed, highly insulating refractory liner which is concentrically disposed in bearing engagement with said inner face of the metal casing so as to provide insulation between molten metal to be disposed in said reservoir and said inner face, said liner including an outwardly extending flange on the lower end thereof and adapted to engage the lower end of said metal casing so as to prevent the molten metal from contacting said casing. ]

[ 11. A low volume, rapid turn-around hot top which comprises, in combination, a reusable metal casing adapted to be supported on the upper end of an ingot mold with the lower end of the casing extending downwardly in overlapping relation with the top portions of the inner side walls of the mold so that said casing floats on molten metal poured into said mold, said casing embodying an essentially vertical, inner metal face defining a reservoir for a feeder head of molten metal, and an expandable, preformed, highly insulating refractory liner which is concentrically disposed in bearing engagement with said inner face of the metal casing so as to provide insulation between molten metal to be disposed in said reservoir and said inner face, said liner being formed in one piece and including an outwardly extending flange on the lower end thereof and adapted to engage the lower end of said metal casing so as to prevent the molten metal from contacting said casing. ]

[ 12. For use in a hot top having a casing adapted to be mounted on the top of an ingot mold and a preformed refractory liner in bearing engagement with the inner surface of said casing, a refractory bottom ring adapted to be mounted on the lower end of said casing with the inner portion of said bottom ring extending inwardly beyond the inner surface of said casing and defining a circumferential groove adjacent the lower end of said casing for seating the refractory liner, the inner periphery of said bottom ring being provided with a vertically extending rim for engaging a portion of the inner surface of said liner to prevent the creepage of molten metal between said ring and said liner. ]

13. A method of assembling a low volume hot top especially adapted for use with a big-end-up ingot mold having a top opening of predetermined area, said method comprising the steps of providing a metal casing adapted to be mounted on the top of a big-end-up mold, the inner surfaces of said casing being inclined so that the central opening formed thereby increases progressively in the downward direction, inverting said casing so that the larger end of the opening is at the top, mounting a refractory bottom ring on the upper end of the inverted casing, said refractory bottom ring having inner surfaces which are complementally formed and substantially flush with the inner surfaces of said casing so as to form a plurality of inclined inner side walls extending to the top surface of said ring, inserting a plurality of longitudinally tapered refractory liner boards downwardly along said inner side walls until the longitudinal edges of adjacent boards abut each other, and forcing the abutting boards downwardly until they are wedged tightly together against said inner side walls with the upper ends of said boards extending at least to the top surface of said refractory ring.

14. A method of assembling a low volume hot top especially adapted for use with a big-end-up ingot mold, said method comprising the steps of providing a supporting casing adapted to be mounted on the top of a big-end-up mold, the inner side walls of said casing being inclined so that the central opening formed thereby increases progressively in the downward direction, inverting said casing so that the larger end of the opening is at the top, mounting a generally complementally formed refractory bottom ring on the upper end of the inverted casing with the inner surfaces of the refractory ring substantially flush with the inner surfaces of the casing, inserting a plurality of preformed, longitudinally tapered refractory liner boards downwardly along the inner side walls of said refractory bottom ring and said casing until the longitudinal edges of adjacent boards abut each other, and forcing the abutting boards downwardly until they are wedged tightly together against the inner side walls of said ring and said casing.

[ 15. For use in a hot top having a plurality of inner side walls, a preformed refractory liner board which is tapered in the longitudinal direction and curved in the transverse direction, said board being made of a highly thermally insulating composition of finely divided refractory material, an organic fibrous material, and a binder. ]

[ 16. A hot top especially adapted for use with ingot molds comprising, in combination, a supporting casing adapted to be mounted on the upper end of the ingot mold and having a plurality of inner side walls, a preformed refractory liner comprising a plurality of transversely curved refractory boards in bearing engagement with the inner side walls of said casing, and a refractory bottom ring secured to the lower end of said casing to substantially prevent the spread of molten metal between the inner surface of said casing and said refractory liner. ]

* * * * *